US011514197B2

(12) United States Patent
Veneroso et al.

(10) Patent No.: US 11,514,197 B2
(45) Date of Patent: Nov. 29, 2022

(54) SECURE DEVICE OPERATING WITH A SECURE TAMPER RESISTANT PLATFORM, CORRESPONDING SYSTEM, METHOD AND COMPUTER PROGRAM PRODUCT

(71) Applicants: Proton World International N.V., Diegem (BE); STMicroelectronics S.r.l., Agrate Brianza (IT)

(72) Inventors: Amedeo Veneroso, Caserta (IT); Olivier Van Nieuwenhuyze, Wezembeek-Oppem (BE)

(73) Assignees: PROTON WORLD INTERNATIONAL N.V., Diegem (BE); STMICROELECTRONICS S.R.L., Agrate Brianza (IT)

( * ) Notice: Subject to any disclaimer, the term of this patent is extended or adjusted under 35 U.S.C. 154(b) by 276 days.

(21) Appl. No.: 17/010,391

(22) Filed: Sep. 2, 2020

(65) Prior Publication Data

US 2021/0073425 A1 Mar. 11, 2021

(30) Foreign Application Priority Data

Sep. 6, 2019 (IT) ........................ 102019000015827

(51) Int. Cl.
*G06F 21/82* (2013.01)
*G06F 21/86* (2013.01)
(Continued)

(52) U.S. Cl.
CPC ................ *G06F 21/86* (2013.01); *G06F 9/54* (2013.01); *G06F 13/362* (2013.01); *G06F 21/77* (2013.01); *G06F 21/82* (2013.01)

(58) Field of Classification Search
CPC .......... G06F 21/86; G06F 21/82; G06F 21/77; G06F 21/71; G06F 21/53; G06F 21/57;
(Continued)

(56) References Cited

U.S. PATENT DOCUMENTS

| | | | |
|---|---|---|---|
| 2014/0317686 A1* | 10/2014 | Vetillard | ................. G06F 21/74 726/2 |
| 2016/0266943 A1* | 9/2016 | Hans | ...................... G06F 13/362 |
| 2020/0162247 A1* | 5/2020 | Nix | ..................... H04L 63/0838 |

OTHER PUBLICATIONS

Global Platform Card Technology, "Open Firmware Loader for Tamper Resistant Element, Version 1.3", Jun. 2017, Document Reference: GPC_FST_134, obtained from <https://globalplatform.org/wp-content/uploads/2018/06/GPC_OpenFirmwareLoaderForTRE_v1.3_PublicRelease.pdf>, retrieved on Jul. 29, 2022 (Year: 2017).*

(Continued)

*Primary Examiner* — Jeffery L Williams
*Assistant Examiner* — Zhimei Zhu
(74) *Attorney, Agent, or Firm* — Slater Matsil, LLP

(57) ABSTRACT

A secure device operating with a secure tamper-resistant platform including a tamper-resistant hardware platform and a virtual primary platform operating with a low level operating system performing an abstraction of resources of the hardware platform, and a secondary platform with a high level operating system providing a further abstraction of resources to applications in which respective internal hosts are embedded, the secure device including an internal host domain including the internal hosts, the secure device including a plurality of physical and/or logical input/output interfaces through which external hosts can access the internal hosts, the virtual primary platform being configured to set interactions between the external hosts and the internal hosts, wherein the internal host domain includes a further set of virtual hosts each configured to operate as a proxy between an input/output interface and an application, each input/output interface being configured to address only one among the virtual hosts.

20 Claims, 4 Drawing Sheets

(51) Int. Cl.
    *G06F 21/77*     (2013.01)
    *G06F 13/362*    (2006.01)
    *G06F 9/54*      (2006.01)

(58) Field of Classification Search
    CPC ..... H04W 12/37; H04W 12/35; H04W 12/40;
        H04W 8/205; H04W 8/183; H04W 4/50;
        H04W 4/70; H04W 12/086; H04W
        12/088; H04W 12/08; H04L 63/0227;
        H04L 63/0236; H04L 63/101
    See application file for complete search history.

(56)                References Cited

OTHER PUBLICATIONS

ETSI, "Smart Cards; Smart Secure Platform (SSP); Requirements Specification," ETSI Technical Specification, European Telecommunications Standards Institute (ETSI), vol. SCP REQ, No. V15.0.0, May 16, 2019, pp. 1-52, XP014344461, Sophia-AntipolisO; France, Retrieved from the Internet: URL:http://www etsi.org/deliver/etsi_ts/103400_103499/103465/15.00.00_60/ts_103465v150000p.pdf.
Globalplatform Technology, "Virtual Primary Platform—Network Protocol Version 1.0.1", Document Reference GPC_FST_140, Oct. 2018, 74 pages.
Globalplatform Technology, "VPP—Firmware Format Version 1.0.1", Document Reference GPC_FST_143, Aug. 2018, 20 pages.
Globalplatform Technology, "VPP—OFL VNP Extension Version 1.0", Document Reference GPC_FST_141, Mar. 2018, 19 pages.
Globalplatform Technology, "VPP—Concepts and Interfaces Version 1.0.1", Document Reference GPC_FST_142, Aug. 2018, 102 pages.

\* cited by examiner

SECURE DEVICE OPERATING WITH A SECURE TAMPER RESISTANT PLATFORM, CORRESPONDING SYSTEM, METHOD AND COMPUTER PROGRAM PRODUCT

CROSS-REFERENCE TO RELATED APPLICATIONS

This application claims the benefit of Italian Application No. 102019000015827, filed on Sep. 6, 2019, which application is hereby incorporated herein by reference.

TECHNICAL FIELD

Embodiments of the present disclosure relate to a secure device operating with a secure tamper-resistant platform including a tamper-resistant hardware platform and a virtual primary platform operating with a low level operating system performing an abstraction of resources of the hardware platform, and a secondary platform with a high level operating system providing a further abstraction of resources to applications in which respective internal hosts are embedded, the secure device including an internal host domain including the hosts, the secure device including a plurality of physical and/or logical input/output interfaces through which external hosts can access the internal hosts, the virtual primary platform being configured to set logical communication channels having as ends the external hosts and the internal hosts.

Embodiments of the present disclosure relate in particular to an embedded or integrated SSP (Smart Secure Platform) device including secure elements for applications in the field of transportation, payment, access control, automotive digital key, eSIM, secure services, identity like ePassport or eID or mobile driving license or other digital services requiring a high security level for storing their asset(s) and/or credential(s).

BACKGROUND

Embedded and Integrated Smart Secure Platform (SSP) are a new class of devices currently under specification in ETSI, as for instance indicated in ETSI TS 103 465 V15.0.0 (2019-05). From the hardware point of view Embedded SSP it is a standalone chip and integrated SSP is an isolated chip integrated in a bigger CPU that may be used to converge services from different existing secure elements.

Currently there are several secure elements in high end phones, which are in some ways similar, such as a secure element that works in conjunction with Mobile Phone TEE (Trusted Execution Environment) for storing passwords and secrets, NFC (Near Field Communication) embedded Secure Elements for NFC payments, the eUICC, i.e., the embedded Universal Integrated Circuit Card used as secure element to authenticate in mobile telecommunications.

The corresponding several physical standalone chips are typically based on similar hardware and operating systems, having similar, but not identical features and requirements. This leads to the need for the convergence of such similar secure devices into a single one. However, a single operating system has resulted to be too complex to manage all the requirements, in particular in terms of certifications, such as for payment applications and approval. For instance, a NFC embedded Secure Element (eSE) needs to be certified Visa, Master Card, EMVco and others. A telecom secure element such as the eUICC instead needs to be tested by many Mobile Network Operators.

Thus, in order to separate the different operating system requirements even if using a single Secure Element (or TRE), it is known to adopt an approach based on a secure device operating with a smart secure platform (SSP), in particular including a virtual primary platform (VPP).

In FIG. 1 it is shown an architecture of a smart secure platform 10, which represents a tamper resistant element (TRE), which includes a hardware platform 11, and a primary platform 1P, specifically embodied by a Virtual Primary Platform 12 or VPP. Indeed the VPP 12, as described in for instance in GlobalPlatform Technology VPP—Concepts and Interfaces, Version 1.0.1 made available by the GlobalPlatform consortium at the URL https://globalplatform.org/specs-library/globalplatform-technology-virtual-primary-platform-v1-0-1/, includes a low level operating system (LLOS) managing security-related hardware functions and native multiprocessing capabilities and services, managing the hardware functions related to communication and firmware management. In FIG. 1 block 12 refers essentially to LLOS. The VPP 12 also includes a block indicated with 12a including an ABI (Application Binary Interface) related to the implementation of the LLOS in order to map any API (Application Programming Interface) which are dependent of the programming language made available on a HLOS (High Level Operating System) which is in a secondary platform 2P accompanied by respective Virtual Primary Platform applications or VPP applications 14. HLOS is an additional Program encompassed in a VPP Application, that provides further abstraction of resources and services to its HLOS applications 14. A same HLOS can support several VPP Applications 14. LLOS in block 12 is running in privileged CPU mode and it is minimal, containing only the functionality which cannot run in unprivileged CPU mode. The LLOS shall include a kernel, i.e., block 12a, supporting the management of multiple Processes and in addition to a kernel, the LLOS shall support:

the initial Bootstrap Program of the Primary Platform
    the management of all the following hardware functions:
        Security Functions,
        Memory Management Functions,
        Memory Transfer Functions,
        System Functions.

Thus, the LLOS in block 12 virtualizes the underlying hardware resources, i.e., represent an abstraction of the resources, and includes a respective VPP API which interacts with multiple VPP applications 14.

On the same level, the secondary platform 2P of the VPP applications 14 it is also shown to include a firmware loader module 13, which is specifically the GlobalPlatform Open Firmware Loader (OFL) in the example, which standardizes how firmware can be loaded and managed in the tamper-resistant hardware platform ii, whereas GlobalPlatform VPP platform 12 defines the security services for the tamper-resistant hardware platform 11 at the primary platform 1P.

The Hardware Platform 11 is implemented in a TRE and may embed:

one or more CPUs, which shall be specifically built for high-level of security
    Random Access Memory (RAM)
    Non-Volatile Memory (NVM) of potentially different types (reprogrammable or not)
    a True Random Number Generator Function
    long-term credentials storage
    security functions (e.g., sensors)
    a Key Protection function to restrict CPU access to secret key material a Memory Management Function in charge of translating the physical memory addresses to virtual
memory addresses and protecting memory spaces according to their access rights.

The hardware platform ii should furthermore embed:
Cryptographic Functions
Memory Transfer Function (e.g., a Direct Memory Access controller).

Even if the VPP platform is very effective in isolating operating system requirements, it has a drawback in impact on the rest of the device. In fact, to address the several VPPs applications, an "addressing protocol" is required, which allows to address the several VPP applications inside. Such protocol defined in VPP is called VPP network protocol, as for instance specified in GlobalPlatform Technology Virtual Primary Platform—Network Protocol Version 1.0.1.

The VPP network protocol can setup pipes, i.e., a logical data circuit routing packet communication channel or channels between two gates of two different hosts within two different host Domains, with modem, Rich EE (REE), Trusted EE and other hosts. A gate is an entry point of the pipe towards a service/application that is operated inside a host, which in turn is a logical entity that operates one or more gates.

Such setting up pipes allows a multiplexing of protocols on the same physical interface.

In FIG. 2 it is shown schematically a network including a TRE host domain 23, including any host embedded in a VPP Application 14 in the tamper resistant element hardware platform 11 and external host domains 30 including:

a TEE Host Domain 31 for group of Hosts 311, 312 in Trusted Execution Environment, MBM Host Domain 33 for the group of Hosts 331 running on the Mobile Broadband Modem, REE Host Domain 32 for the group of Hosts 321, 322, 323 on the Rich Execution Environment.

Pipes P connecting gates of a TRE Host $23_1$ in the TRE host domain 23 to gates of hosts the external host domains 31, 32, 33 are shown.

In addition to that, legacy interfaces may be requested to be restricted to specific classes of VPP applications for security reasons.

In particular, in specific devices the secure element needs to access to GPIO (General Input Output ports) pins to control user inputs and perform other functions.

In specific applications, also there is the requirement to limit the visibility of the GPIOs pins to specific VPP applications.

SUMMARY

On the basis of the foregoing description, the need is felt for solutions which overcome one or more of the previously outlined drawbacks.

According to one or more embodiments, such an object is achieved through devices having the features specifically set forth in the claims that follow. Embodiments moreover concerns a related method for managing access to hosts as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The claims are an integral part of the technical teaching of the disclosure provided herein.

As mentioned in the foregoing, the present disclosure provides solutions regarding a secure device A secure device operating with a secure tamper-resistant platform including a tamper-resistant hardware platform and a virtual primary platform operating with a low level operating system performing an abstraction of resources of the hardware platform, and a secondary platform with a high level operating system providing a further abstraction of resources to applications in which respective internal hosts are embedded, the secure device including an internal host domain including the internal hosts, the secure device including a plurality of physical and/or logical input/output interfaces through which external hosts can access the internal hosts, the virtual primary platform being configured to set interactions between the external hosts and the internal hosts, wherein the internal host domain includes a further set of virtual hosts each configured to operate as a proxy between an input/output interface and an application, each input/output interface being configured to address only one among the virtual hosts.

In various embodiments, the secured device is configured to perform a filtering including selecting specific virtual hosts able to set an interaction with an internal host embedded in a specific application and vice versa.

In various embodiments, the interactions include logical communication channels having as ends the external hosts and the internal hosts.

In various embodiments, the filtering includes selecting specific virtual hosts able to set a logical communication channel with an internal host embedded in a specific application and vice versa.

In various embodiments, the filtering includes accessing a whitelist on the basis of a firmware family identifier.

In various embodiments, the whitelist is loaded with the loading of the firmware.

In various embodiments, the firmware family identifier is obtained by a descriptor of the application.

In various embodiments, the firmware family identifier is an UUID descriptor.

In various embodiments, the device is an embedded Smart Secure Platform device and the virtual primary platform is a GlobalPlatform Virtual Primary Platform.

In various embodiments, the device is configured to verify the authorization of a specific firmware family identification request for a specific firmware during the loading of the firmware, in particular implemented by the TRE or its loader.

The present disclosure provides also solutions regarding a method for managing access between internal hosts and external host in a secure device, setting interactions between the external hosts and the internal hosts, in particular logical communication channels having as ends external hosts and internal hosts, according to any of the previous embodiments, including adding to the internal host domain a further set of virtual hosts each configured to operate as a proxy between an input/output interface and an application, addressing with each input/output interface only one among the virtual hosts.

In various embodiments, the method includes filtering, selecting specific virtual hosts able to interact with an internal host embedded in a specific application and vice versa.

In various embodiments, the method includes filtering includes registering a whitelist of the virtual hosts for a given application during the loading of the firmware of the application.

In various embodiments, the the setting logical communication channels having as ends the external hosts and the internal hosts sets the logical communication channels as including the virtual hosts selecting the ends on the basis of the proxy configuration of the virtual hosts and of the selection criteria specified in the filtering step, in particular by the step of registering a whitelist of the virtual hosts for a given application during the loading of the firmware of the application.

The present disclosure provides also solutions regarding a computer-program product that can be loaded into the memory of at least one processor and comprises portions of software code for implementing the method of any of the previous method embodiments.

BRIEF DESCRIPTION OF THE DRAWINGS

For Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figures parts, elements or components which have already been described with reference to FIGS. 1 to 4 are denoted by the same references previously used in such figures; the description of such previously described elements will not be repeated in the following in order not to overburden the present detailed description.

The solution here described substantially provides adding in the tamper resistant element host domain a plurality of virtual hosts associated to the input/output interfaces of the tamper resistant element, a filtering mechanism of virtual hosts able to interact with an internal host embedded in a specific application, i.e., firmware instance, run in the tamper resistant element, and vice versa, being also provided.

Figure 3:
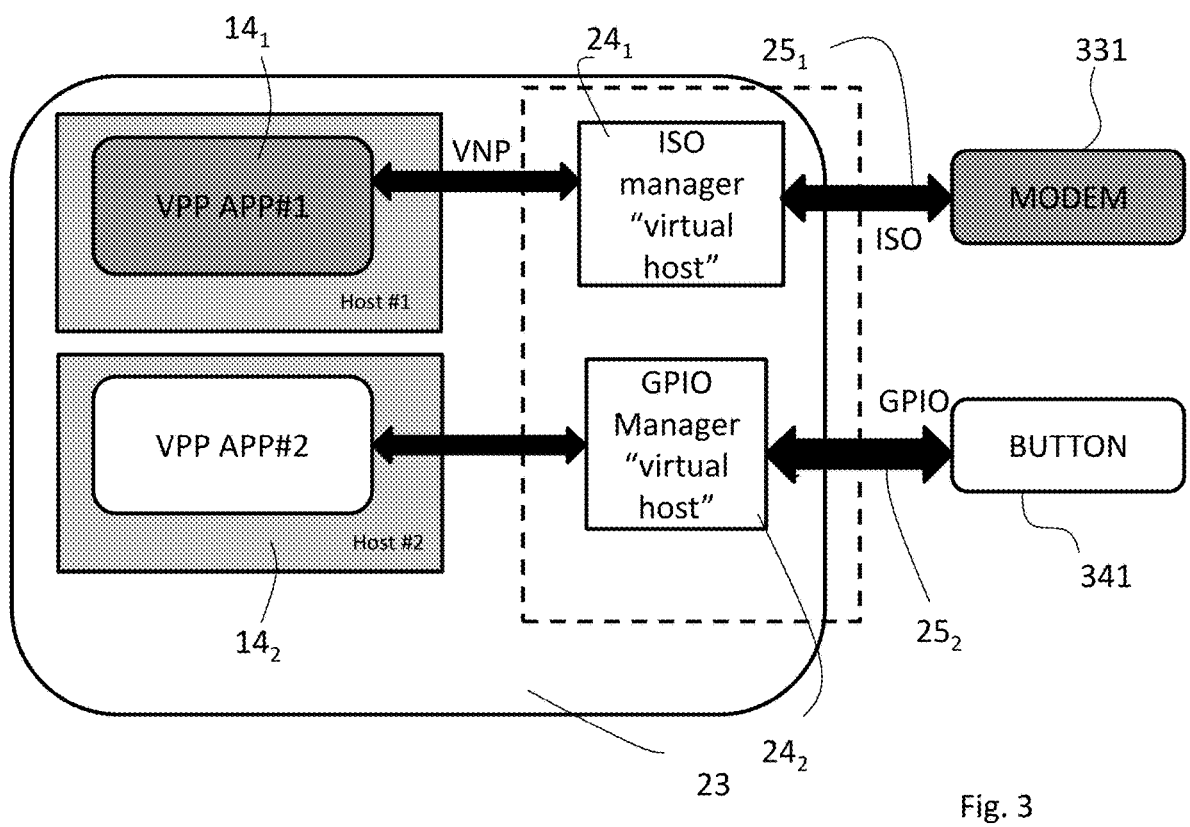
FIG. 3 shows a block diagram illustrating an embodiment of the method here described.

To this regard, in FIG. 3 it is shown a schematic diagram representing a host domain 23, which represents the TRE host domain, which may correspond to the host domain of the Smart Secure Platform device 10, and is representative of internal hosts, embedded in an application which is run in the Smart Secure Platform device 10, specifically a VPP application. A VPP application is an instance of a firmware on a VPP 12. Its use is case dependent and can run a High-Level Operating System (HLOS), i.e., an additional program encompassed in a VPP Application, that provides further abstraction, i.e., interface layer, of resources and services to its HLOS application or applications, and such HLOS application or applications. In the host domain 23 are shown the VPP applications $14_1$, $14_2$ which embed respective hosts.

Then in FIG. 3 are represented external hosts 331 and 341, which are interfaced to the host domain 23 of the Smart Secure Platform device 10 by external interfaces 25, specifically an ISO interface $25_1$ and a GPIO interface $25_2$.

The external host 331 corresponds to a modem, thus it corresponds to an host of Mobile Broadband Modem host domain 33, to which the first VPP applications $14_1$ accesses through the ISO interface $25_1$ and vice versa. The external host 342 corresponds to a button, e.g., Sign-In Google button, in other words a control input accessing the second VPP application $14_1$ through the GPIO interface $25_2$ and vice versa. Thus, the virtual primary platform 12 being configured to set interactions between the external hosts and the internal hosts. By way of examples of such interactions are set pipes having as ends the external hosts and the internal hosts. In other words, are set up respective pipes, as mentioned seen as logical data circuit routing packet communication channel between two gates of two different hosts, in this case relating to the VPP applications $14_1$, $14_2$, and hosts 31, 32, within two different host domains, i.e., the host domain 23 of the Smart Secure Platform device 10 and external host domain of external hosts 331, 341. According to the solution here described, this is obtained including in the pipes virtual hosts 24, external interfaces 25, which are configured to manage the external hosts 331, 341. Thus, a first pipe is represented by elements 331, $24_1$, $25_1$, $14_1$, and a second pipe is represented by elements 341, $24_2$, $25_2$, $14_2$.

According to the solution here described, in each pipe each single input/output port, i.e., external interface 25, addresses one virtual host 24 within the TRE host domain 23. On each input/output port there is no possibility of using an addressing mechanism if connected to legacy devices.

As shown, the LLOS of the VPP 12 has its host domain 23 added with virtual hosts 24, each of them being configured to operate as a proxy of a physical external input output interface 25, i.e., acts as intermediary for the requests or connections of physical external input output interfaces 25. The virtual host 24 is then configured to direct the connection from the external interface 25 is then directed to a specific VPP Application 14. In various embodiments, also virtual host domains can be defined and the virtual hosts 24 may be also assigned to one or also multiple virtual host domains.

According to the solution here described, the secure device 10 is also configured to implement a filtering mechanism, selecting the virtual hosts 24 able to interact with a given internal host 23 embedded in a specific application 14 and vice versa.

Such a filtering mechanism preferably exploits a whitelisting mechanism, i.e., explicitly allowing some virtual hosts 24 access to a specific internal host 23, in particular it may exploit the white-listing implemented in the VPP 12 in a virtual network protocol, as described in Virtual Primary Platform—Network Protocol—Public Release v1.0.

The network involves a collection of host domains, grouping hosts, as already described, according to functional perimeters, such as the TRE Host Domain, hosts, a network controller host and a router, which routes packets in pipes between hosts under the control of the network controller host. In this context a valid network is a collection of at least two hosts which are logically connected together and physically connected via the router to which the host has a static pipe.

The router is configured to maintain two separate whitelists, per each host, to filter access to the host on the basis of an host identifier and of a host domain identifier. The router only routes packets from one host to another if the source host identifier is in the host whitelist of the destination host and if the source host domain identifier of the source host is in the host domain whitelist of the destination host. Empty whitelist prevents the host from receiving any packet from any other host.

Thus the VPP 12 is then configured to identify a further virtual hosts white list WL of VPP applications at a firmware loading time by the OFL module 13, e.g., registering such further virtual hosts white list WL to the VPP Network Controller Host at the firmware loading time, in a way similar to the procedure like the one described in FIG. 6.1.3 of Virtual Primary Platform—Network Protocol—Public Release v1.0.1, for the other host and host domain whitelists.

In the VPP application 14 the application descriptor includes identifiers of the type Universal Unique Identifier (UUID), among which the Family Firmware Identifier, identifying that a particular Firmware belongs to a particular class of Firmware. Such UUID may be used as a field identifying the application 14 in a related white list. For instance, a whitelist WL can indicate the following:

for eUICC VPP application, identified by the eUICC Family Firmware Identifier, in the set of applications 14 the virtual host 25 with which it can interact is the ISO virtual host;

for eSE VPP application, identified by the eSE Family Firmware Identifier, in the set 14 of applications, the virtual host 25 with which it can interact is the CLF (Contactless Front End) virtual host for TEE companion VPP application, identified by the eSE Family Firmware Identifier, in the set 14 of applications the virtual host 25 with which it can interact is the GPIO virtual host.

Thus, the whitelist can be seen as a table, in particular a look-up table, which is accessed with an identifier of the VPP application 14 and returns the list of virtual hosts 25 associated to such VPP application 14, which must operate as proxy for the external interface 25 uniquely associated to it.

As just indicated, the UUID can be for instance the Firmware Family Identifier defined in OFL. In case of applications 14 which have to access commands or control user inputs, such as the button 32, or to limit the GPIO access to a specific application 14 a new Firmware Family Identifier may be defined (e.g., Family_HWController). The white list corresponding to the Firmware Family Identifier Family_HWController for that identifier contains the GPIO Manager Virtual Host, $25_2$. All the other white lists are to be configured to be prevented to communicate to it, i.e., do not include GPIO Manager Virtual Host, $25_2$ as accessible external host.

The Family identifier, as shown in the VPP standard, is a number written in the firmware that has two impacts:

The Family identifier sets the white list of the Vpp Application 14; and

The Family identifier identifies the ecosystem allowing the download of a VPP application; e.g., for telecom family identifiers, GSMA ecosystem and certificates are used.

As an example a Firmware Family Identifier may have the UUID form:=NID is [OEM domain.name] or NID is [SDO domain.name] and NSS is Firmware Family name.

NID indicates the identifier, OEM domain.name is the Fully Qualified Domain Name (FQDN) of the company or Original Equipment Manufacture defining the host 23 of the application 14, for instance the domain name of a telecom company, [SDO domain.name] defines the FQDN of a standards development organization or an industry forum, such as GlobalPlatform (globalplatform.org). NSS is the Use Case name, e.g., "keyless entry service."

Figure 4:
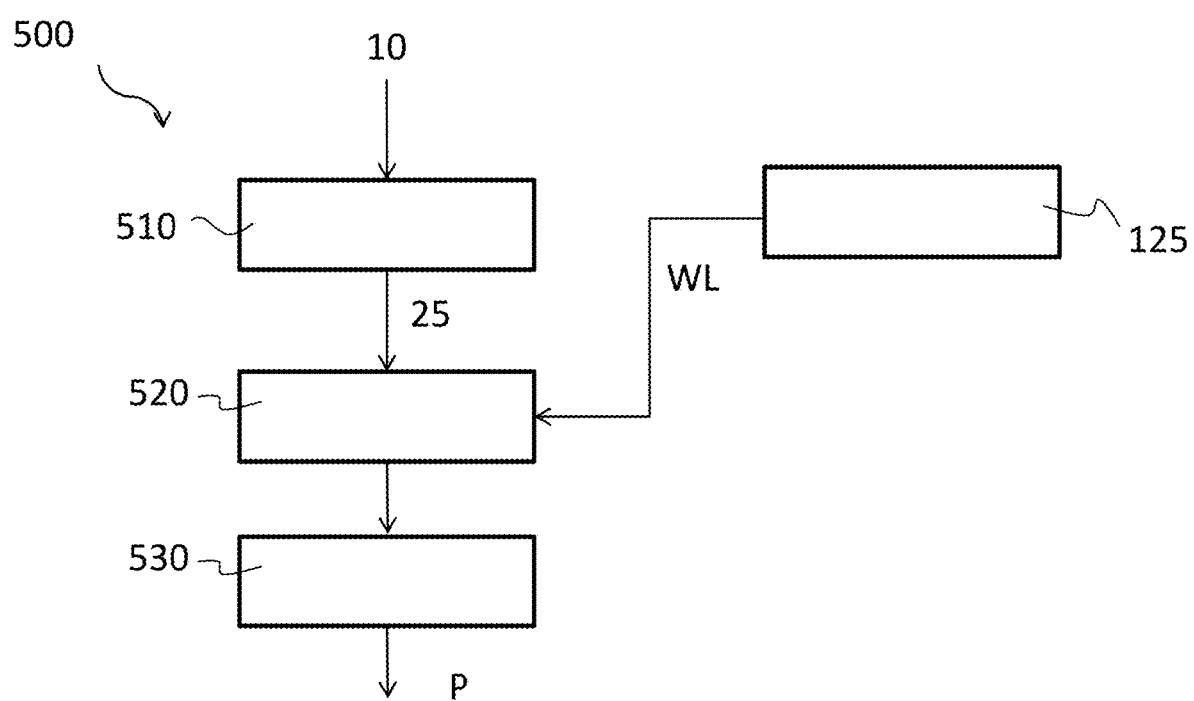
FIG. 4 shows a flow diagram illustrating operations of an embodiment of the method here described.

Thus, as shown in the flow diagram of FIG. 4, which represents an embodiment of the method here described, given a secure device 10 operating with a secure tamper-resistant platform including a tamper-resistant hardware platform ii and a virtual primary platform 12 operating with a low level operating system performing an abstraction of resources of the hardware platform 11, and a secondary platform 2P with a high level operating system providing a further abstraction of resources to applications 14 in which respective internal hosts 23 are embedded, the secure device 10 including an internal host domain 23 including the internal hosts 23, the secure device 10 including a plurality of input/output interfaces 25, which can be physical and/or logical interfaces, through which external hosts 311, 341 can access the internal hosts 23, a method 500 for managing access between internal hosts and external host by setting logical communication channels P having as ends the external hosts, e.g., 311, 341 and the internal hosts 23, includes the steps of providing 510 a further set of virtual hosts 24 each configured to operate as a proxy between an input/output interface 25 and an application 14, each input/output interface 25 addressing only one among the virtual hosts 24, and filtering 520, selecting specific virtual hosts 25 able to interact with an internal host 23 embedded in a specific application 14 and vice versa.

The filtering step, in a preferred embodiment, includes a step 125 of registering a whitelist WL of the virtual hosts for a given application during the loading of the firmware of the application. Such loading of the firmware may take place before or after step 510 of providing a further set of virtual hosts 24. The method 500 of FIG. 4 may include a specific step of providing such secure device 10 before step 510 of providing the virtual hosts 23.

For instance, the SET WHITELIST command (specifically LINK_SET_HOST_WHITELIST as per par. 5.3.2.5 of GlobalPlatform Technology Virtual Primary Platform—Network Protocol Version 1.0.1.) may be issued (or received) by the VPP application $14_1$. The solution here described provides that the virtual network protocol intercepts the SET WHITELIST command and filters it or not depending on the whitelist configuration; then, the traditional white list mechanism by VPP virtual network protocol is applied.

Figure 1:
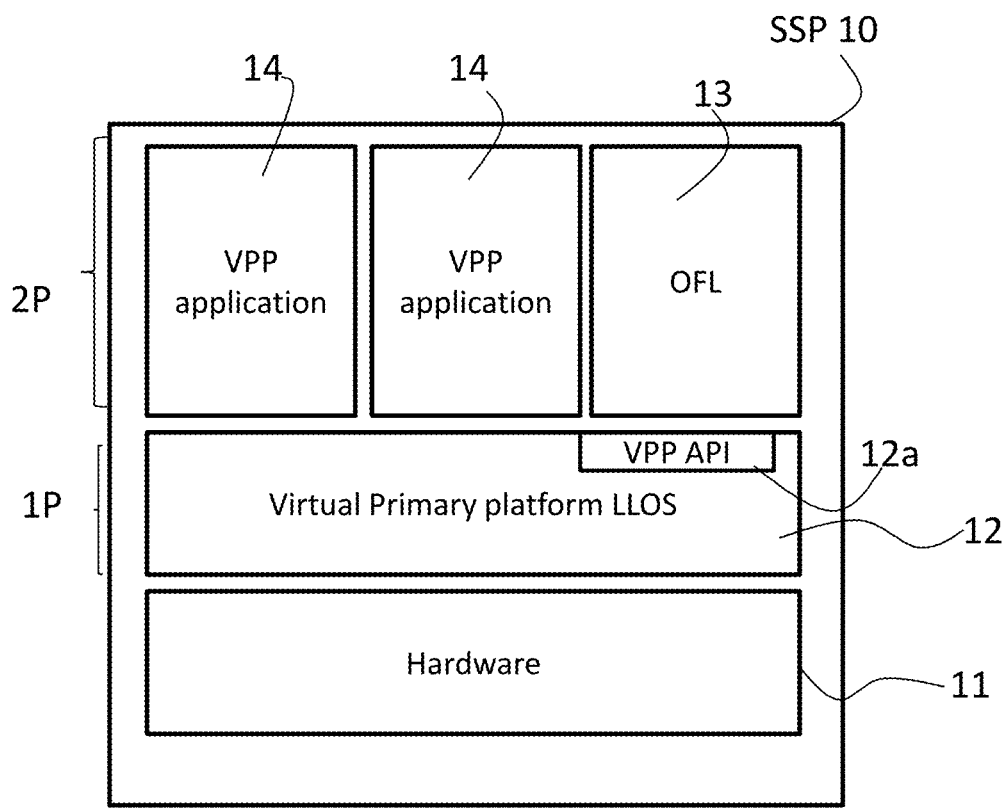
FIG. 1 shows a block diagram illustrating a smart secure platform.
Figure 2:
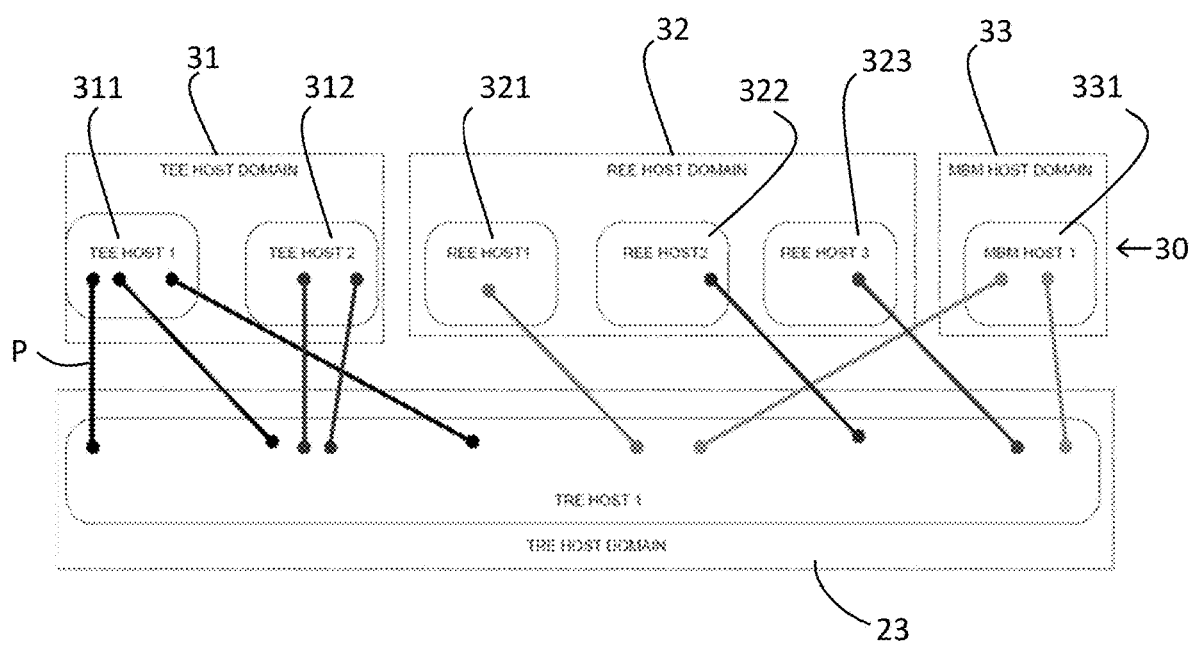
FIG. 2 shows a block diagram illustrating a network having several host domains.

As shown in FIG. 1, the method 500 for managing access between internal hosts and external host, following steps finally sets logical communication channels P in a step 530. Such setting step of logical communication channels P having as ends the external hosts 311, 341 and the internal hosts 23 sets such logical communication channels including the virtual hosts 25 provided in step 510 a selecting the ends on the basis of the proxy configuration of the virtual hosts and of the selection criteria specified in the filtering step 520, in particular by the whitelisting step 125, registering a whitelist of the virtual hosts for a given application during the loading of the firmware of the application.

In various embodiments, the device here described may be configured to verify the authorization of a specific firmware family identification request for a specific firmware during the loading of the firmware, by way of example implemented by the TRE or its loader.

The embodiment just described allows, in particular compared to eSSP, limited or no impact on handset components and support of association of physical interfaces to VPP applications. Also the solution allows using the VPP application to isolate services one with respect to the other Of course, without prejudice to the principle of the invention, the details of construction and the embodiments may vary widely with respect to what has been described and illustrated herein purely by way of example, without thereby departing from the scope of the present invention, as defined by the ensuing claims.

The filtering mechanism can be different from the whitelist mechanism. For instance, for filtering the virtual hosts able to interact with an internal host embedded in a specific application run in the tamper resistant element, a blacklisting mechanism can be implemented or the whitelisting can be implemented with no relationship with the VNP whitelist or with the Family Identifier.

The set of external interfaces 25 may include physical and/or logical interfaces, since the solution here described can be applied also when multiple hosts share a physical interface that has some logical management on top. For instance, SWP (Single Wire Protocol) can be used to be connected both to a NFC router and to an application processor. This can be managed with two different pipes over the VNP protocol that are both forwarded on the same physical link (SWP), but on two different logical channels on SWP, called HCI (Host Controller interface) pipes.

In various embodiments the virtual primary platform is configured to set interactions between the external hosts and the internal hosts which may include that a pin is used for signal transmission only, e.g., the value on the pin could be only logical zero or logical one, or Set and Reset.

What is claimed is:

1. A secure device comprising:
   a secure tamper-resistant platform comprising:
      a tamper-resistant hardware platform;
      a virtual primary platform operating with a low level operating system performing an abstraction of resources of the hardware platform; and
      a secondary platform operating with a high level operating system providing a further abstraction of resources to applications in which respective internal hosts are embedded;
   a plurality of physical and/or logical input/output interfaces providing external hosts access to the internal hosts, wherein the virtual primary platform is configured to set interactions between the external hosts and the internal hosts; and
   an internal host domain comprising:
      the internal hosts; and
      a further set of virtual hosts each configured to operate as a proxy between an input/output interface and an application, wherein each input/output interface is configured to address only one of the virtual hosts.

2. The secure device of claim 1, wherein the interactions include logical communication channels having as ends respective ones of the external hosts and the internal hosts.

3. The secure device of claim 1, wherein the secured device is configured to filter the set of virtual hosts, wherein the filtering includes selecting specific virtual hosts able to set a logical communication channel with an internal host embedded in a specific application, and vice versa.

4. The secure device of claim 1, wherein the secured device is configured to filter the set of virtual hosts, wherein the filtering includes selecting specific virtual hosts able to set an interaction with an internal host embedded in a specific application, and vice versa.

5. The secure device of claim 4, wherein the filtering includes accessing a whitelist based on a firmware family identifier.

6. The secure device of claim 5, wherein the whitelist is loaded with loading of firmware associated with the firmware family identifier.

7. The secure device of claim 5, wherein the firmware family identifier is obtained by a descriptor of the specific application.

8. The secure device of claim 7, wherein the firmware family identifier is an UUID descriptor.

9. The secure device of claim 1, wherein the secure device is an embedded Smart Secure Platform device and the virtual primary platform is a GlobalPlatform Virtual Primary Platform.

10. The secure device of claim 1, wherein the secure tamper-resistant platform or its loader is configured to verify authorization of a specific firmware family identification request for a specific firmware during loading of the specific firmware.

11. A method for operating a secure device having a secure tamper-resistant platform comprising a tamper-resistant hardware platform, a virtual primary platform, and a secondary platform, the method comprising:
   operating, by the virtual primary platform, with a low level operating system performing an abstraction of resources of the tamper-resistant hardware platform;
   operating, by the secondary platform, with a high level operating system providing a further abstraction of resources to applications in which respective internal hosts are embedded, the internal hosts being in an internal host domain;
   providing external hosts access to the internal hosts via a plurality of physical and/or logical input/output interfaces;
   setting, by the virtual primary platform, interactions between the external hosts and the internal hosts;
   adding to the internal host domain a further set of virtual hosts each configured to operate as a proxy between a respective input/output interface and an application; and
   addressing with each input/output interface only one of the virtual hosts.

12. The method of claim 11, further comprising filtering the set of virtual hosts, the filtering comprising selecting specific virtual hosts able to interact with an internal host embedded in a specific application, and vice versa.

13. The method of claim 12, wherein the filtering comprises registering a whitelist of the virtual hosts for the specific application during a loading of firmware of the specific application.

14. The method of claim 13, further comprising setting logical communication channels having as ends respective ones of the external hosts and the internal hosts.

15. The method of claim 14, wherein the setting the logical communication channels comprises setting the logical communication channels to include the virtual hosts selecting the ends based on a proxy configuration of the virtual hosts and based on the whitelist.

16. A computer-program product loadable into a memory of at least one processor and comprising portions of software code for implementing a method for operating a secure device having a secure tamper-resistant platform comprising a tamper-resistant hardware platform, a virtual primary platform, and a secondary platform, the method comprising:
  operating, by the virtual primary platform, with a low level operating system performing an abstraction of resources of the tamper-resistant hardware platform;
  operating, by the secondary platform, with a high level operating system providing a further abstraction of resources to applications in which respective internal hosts are embedded, the internal hosts being in an internal host domain;
  providing external hosts access to the internal hosts via a plurality of physical and/or logical input/output interfaces;
  setting, by the virtual primary platform, interactions between the external hosts and the internal hosts;
  adding to the internal host domain a further set of virtual hosts each configured to operate as a proxy between a respective input/output interface and an application; and
  addressing with each input/output interface only one of the virtual hosts.

17. The computer-program product of claim 16, wherein the method further comprises filtering the set of virtual hosts, wherein the filtering comprises selecting specific virtual hosts able to interact with an internal host embedded in a specific application, and vice versa.

18. The computer-program product of claim 17, wherein the filtering comprises registering a whitelist of the virtual hosts for the specific application during a loading of firmware of the specific application.

19. The computer-program product of claim 18, wherein the method further comprises setting logical communication channels having as ends respective ones of the external hosts and the internal hosts.

20. The computer-program product of claim 19, wherein the setting the logical communication channels comprises setting the logical communication channels to include the virtual hosts selecting the ends based on a proxy configuration of the virtual hosts and based on the whitelist.

* * * * *